United States Patent [19]

Silverman et al.

[11] 3,979,140

[45] Sept. 7, 1976

[54] SEISMIC METHOD FOR LOGGING POSITION OF A DEEP BOREHOLE IN THE EARTH

[75] Inventors: Daniel Silverman; John R. Bailey, both of Tulsa, Okla.

[73] Assignee: Senturion Sciences, Inc., Tulsa, Okla.

[22] Filed: June 3, 1974

[21] Appl. No.: 475,589

[52] U.S. Cl...................... 181/120; 181/106; 181/119; 175/1; 175/45; 340/15.5 MC; 340/15.5 BH
[51] Int. Cl.².......................................... G01V 1/40
[58] Field of Search ........... 181/102, 106, 116, 118, 181/120, 119; 340/18 NC, 18 DC, 15.5 MC, 15.5 BH; 175/1, 40, 45, 237; 73/151; 166/308

[56] References Cited
UNITED STATES PATENTS

| | | | |
|---|---|---|---|
| 2,281,751 | 5/1942 | Cloud | 175/1 |
| 2,770,312 | 11/1956 | Silverman | 181/106 |
| 2,898,084 | 8/1959 | Eckel et al. | 175/1 |
| 2,933,144 | 4/1960 | Scott et al. | 340/18 LD |
| 3,020,964 | 2/1962 | Graham et al. | 175/237 |
| 3,268,859 | 8/1966 | Watts | 340/15.5 MC |
| 3,322,232 | 5/1967 | Chalmers et al. | 181/120 |
| 3,493,072 | 2/1970 | Johnston | 181/120 |
| 3,653,460 | 4/1972 | Chelminski | 181/120 |
| 3,739,871 | 6/1973 | Bailey | 175/1 |
| 3,817,345 | 6/1974 | Bailey | 340/15.5 MC |
| 3,833,087 | 9/1974 | Chocet | 181/120 |

*Primary Examiner*—H.A. Birmiel
*Attorney, Agent, or Firm*—Head, Johnson & Chafin

[57] ABSTRACT

Method and apparatus for logging the position of a deep borehole filled with liquid in the earth, comprising a long, continuous small diameter pipe adapted to be reeled up on a drum mounted on a vehicle, and means to insert the end of the pipe into the mouth of a borehole and to lower it to any desired depth in the earth. A plurality of geophones are positioned on the surface of the earth in the vicinity of the borehole with conventional amplifying and recording means connected thereto. Means are provided on the vehicle for compressing a liquid or gas, and injecting it into the pipe. On the bottom end of the pipe is a chamber in which this pressurized fluid can be stored. Fast acting valve means are provided which on signal can suddenly open and permit the stored fluid in the chamber to explosively expand into the liquid in the annulus of the borehole. Such explosive injection of the fluid from the chamber into the well will cause a seismic wave to be generated which will expand until it reaches the surface and is detected and recorded by the geophones. Electrical control wires may be carried in the pipe means by which the valve can be timed and controlled, so that the travel times of the seismic wave from the chamber to the geophones can be determined, from which the position of the borehole at the depth of the chamber can be determined.

16 Claims, 4 Drawing Figures

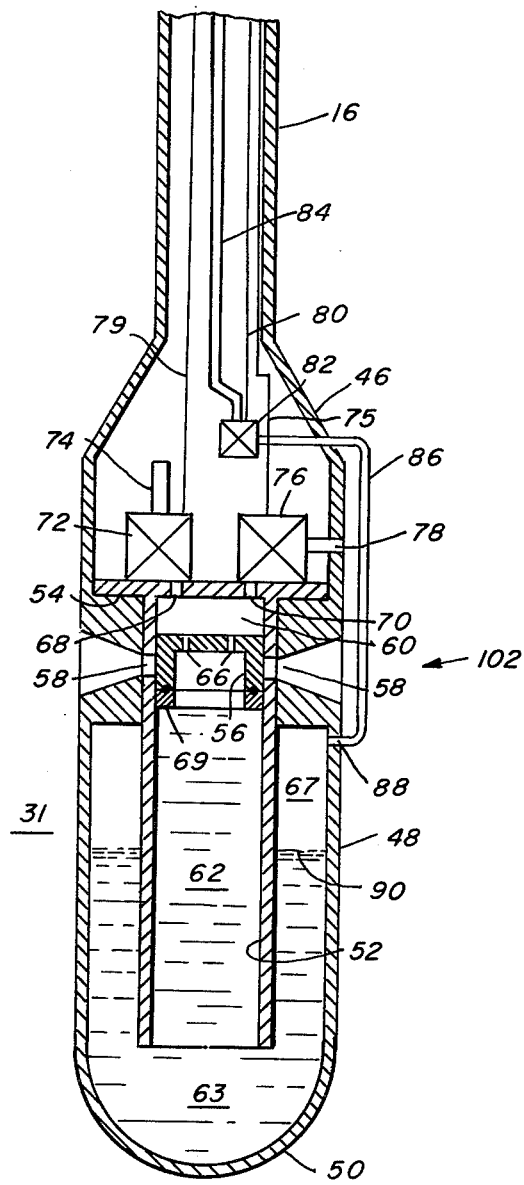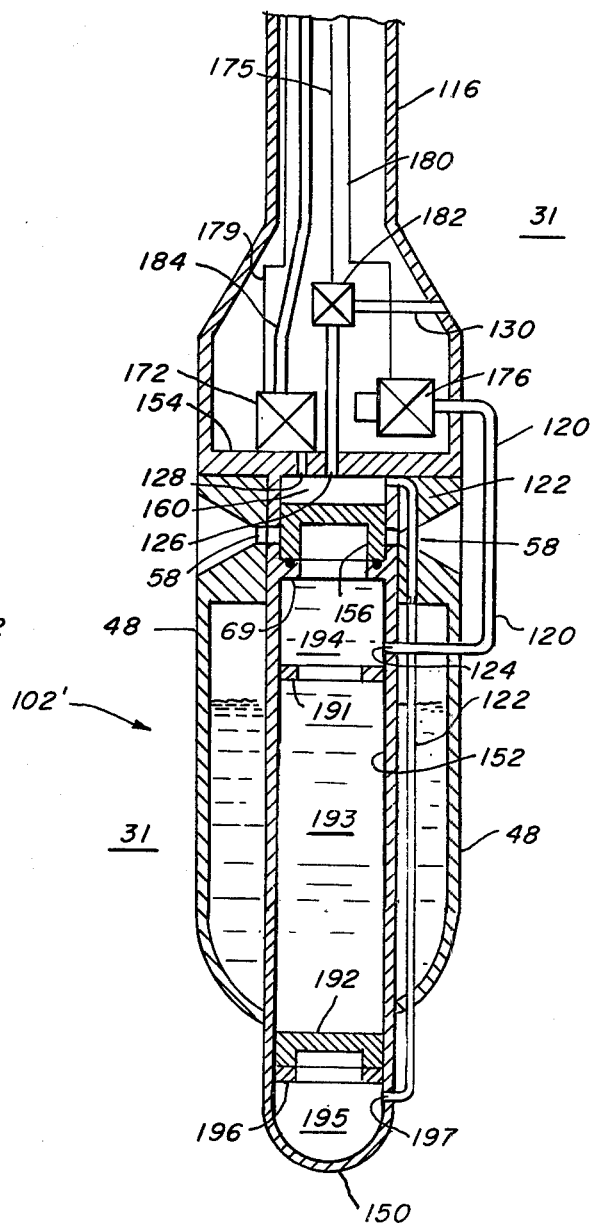
FIG. 3
FIG. 4

SEISMIC METHOD FOR LOGGING POSITION OF A DEEP BOREHOLE IN THE EARTH

CROSS REFERENCES TO RELATED APPLICATIONS

This application is related to the copending application of one of us, Ser. No. 371,142, entitled "CONTINUOUS BIT POSITIONING SYSTEM" now U.S. Pat. No. 3,817,305 which is hereby entered into this application by reference. It is also related to U.S. Pat. No. 3,739,871, entitled "MAPPING OF EARTH FRACTURE INDUCED BY HYDRAFRACTURING," which is hereby entered into this application by reference. This application is also related to two other applications by the same inventors as this application, and filed in the Patent Office on the same date as this application Ser. No. 475,581 ., entitled "SEISMIC METHOD FOR DETERMINING THE POSITION IN THE EARTH OF THE BOTTOM END OF A LONG PIPE IN A DEEP BOREHOLE"; and Ser. No. 47590 "SEISMIC METHOD FOR DETERMINING POSITION OF THE BIT ON A DRILL STEM IN A DEEP BOREHOLE IN THE EARTH."

BACKGROUND OF THE INVENTION

This invention lies in the field of elastic wave generation transmission and detection in the earth. More particularly it is concerned with determining the position in the earth of the bottom end of a long pipe extending into a deep borehole in the earth. Still more particularly, it concerns determination of the velocity of elastic waves in the earth.

In the prior art various means have been devised for logging deep boreholes in the earth. Most of these have been by the use of electrical methods in which currents are applied to the walls of the boreholes at selected depths and the corresponding potentials are measured in the earth. Also various instrumentations have been devised passively for measuring radiation in the earth, or for irradiating the earth with high energy radiation, and determining the response of the earth to this irradiation.

In regard to the use of elastic waves in the logging of boreholes, this has been confined principally to the use of low energy ultrasonic impulses applied at a selected point in a borehole and detecting the same energy after passing through a selected length of the rock walls of the boreholes. Unfortunately, the energy available in such logging systems has been quite small, and therefore the information that has been derived has been limited solely to the immediate area of the borehole at which the instrument is positioned.

SUMMARY OF THE INVENTION

It is a primary object of this invention to provide a method and apparatus for seismically logging a borehole in the earth. More particularly, it is a object of this invention to provide seismic information from which the position of the borehole in North-South and East-West position at any selected depth can be determined. Still more particularly, it is an object of this invention to provide information from which the seismic velocity in rocks bordering the borehole can be determined.

These and other objects are realized and the limitations of the prior art are overcome in this invention by providing a source of elastic or seismic waves, which can be of considerable energy, which can be positioned at any selected depth, in a water-filled borehole. Thus, by generating a seismic wave at various depths, and detecting these seismic waves at a plurality of geophones arrayed in the earth near the surface the true position of the source in three dimensions in the earth can be determined.

A long, continuous, small diameter pipe is provided which can be coiled onto a large drum, from which it can be reeled off and into a borehole, and lowered to a selected depth in the borehole. Such long pipes are now in use in the oil industry for introducing chemicals at selected depths, in a borehole. If desired, electrical control wires, and signal circuits can be inserted into the inside of the pipe reaching from the free end, which is lowered into the borehole, to the surface end, which is at the reel. The reel can conveniently be mounted on a large truck so that it can be carried from one point to another.

A source of high pressure gas or liquid is injected into the surface end of the pipe. At the bottom end is a chamber in which this high pressure liquid or gas can be stored. On signal from the surface a fast-acting valve is controlled to suddenly open and to permit the pressurized fluid stored in said chamber, to explosively expand through a plurality of ports into the liquid in the borehole. This explosive ejection of the fluid will cause a seismic wave to be generated, which can be detected at the surface geophones. Knowing the depth of the pipe in the ground, and of the instant at which the valve was opened, the travel times of the seismic waves to the surface geophones and the precise position of the chamber in the earth can be determined. Also elastic wave velocities in the earth can be determined by positioning the chamber at two or more selected depths, and determining the differential travel time corresponding to the differential depths between plural measurements. Furthermore, pressure detectors can be positioned in the wall of the pipe at selected distance above the chamber to receive the seismic wave as it passes up through the rocks bordering the borehole.

BRIEF DESCRIPTION OF THE DRAWINGS

These and other objects and advantages of this invention and a better understanding of the principles and details of the invention will be evident from the following description taken in conjunction with the appended drawings, in which;

FIGS. 3 and 4 illustrate two types of chamber and fast acting valve systems for attachment to the lower end of the pipe.

Figure 1:
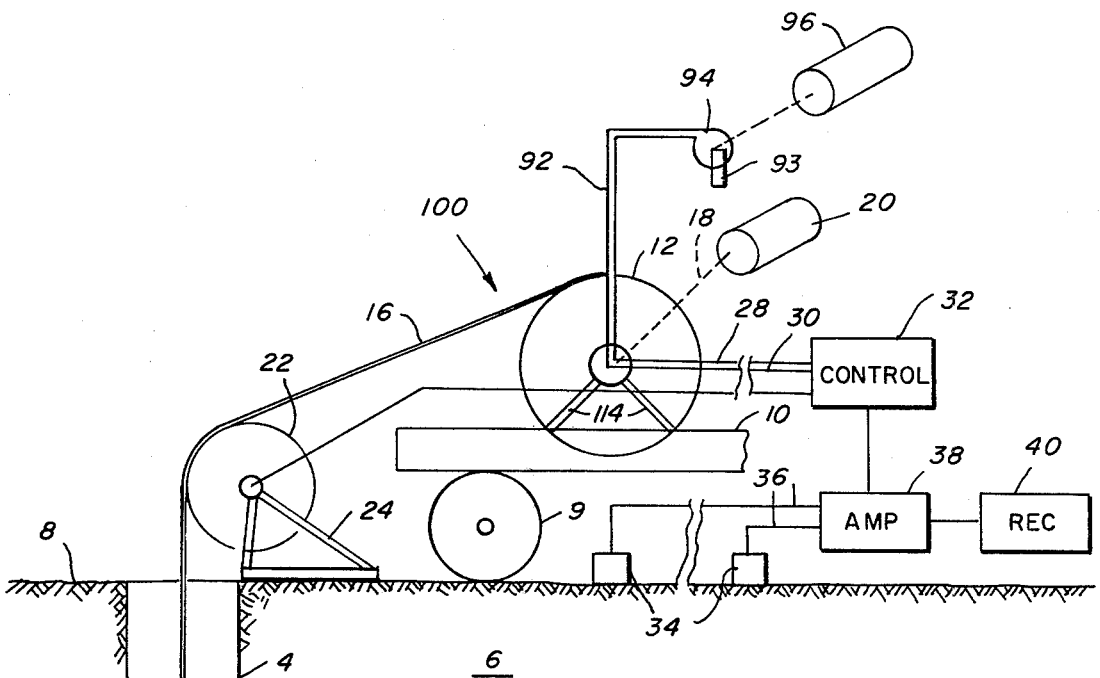
FIG. 1 represents in schematic fashion and in vertical cross-section of the earth, how a long continuous pipe carried on a reel, on a vehicle can be used for seismic logging of a borehole.

Referring now to the drawings and in particular to FIG. 1, there is shown borehole in the earth indicated by the numeral 4 having a bottom at 26. This borehole is in the earth 6 having a surface 8 on which rests a wheeled vehicle 10 carrying a large drum or reel 12 controlled by motor 20 through means 18. This drum 12 carries a long length of small diameter pipe or tubing or other rigid conduit means 16 which can be unreeled from the drum and carried over a measuring wheel 22 supported in a structure 24 suspended over the well bore 4. The wheel 22 serves to measure the depth of the bottom end of the pipe in the borehole. The pipe 16 has on its lower end a chamber 50 and valve system indicated generally by the numeral 102 which will be described in more detail in FIGS. 3 and 4.

At the surface there are a plurality of geophones or other earth vibration detectors 34 which are connected by cables 36 to amplifier 38 and to recorder 40. The geophones, amplifiers, and recorder can be conventional and are well known in the art, and will need no further description. Reference is made to copending application Ser. No. 371,142 for further details of how such geophones, amplifier and recorder systems are utilized in a type of measurement similar to that carried out by this apparatus.

The pipe 16 carries a plurality of electrical conductors from the bottom end to the drum, where they are carried as cables 28 and 30 to control units 32. Connection is provided between the control unit and amplifier 38 by means of leads 42. Since certain sensors are utilized in the assembly connected the lower end of the pipe 16, these conductors will provide signals which will be amplified and recorded along with the signals from the geophones 34. Also an indication of the rotation of the wheel 22 goes by way of lead 23 to the control and thence to the amplifier and recorder, as a measure of the length of pipe in the borehole.

Pump means indicated schematically by numeral 94 is connected by pipe 92 to the surface end of the pipe 16. The pump 94 is driven by motor 96. The inlet to the pipe 93 can provide a suitable gas or liquid which is compressed by the pump and inserted into the pipe 16, which fills the pipe and flows downwardly, to the bottom to the chamber illustrated in FIGS. 3 and 4.

Referring now to FIG. 3 there is shown a chamber indicated generally by the numeral 102. It comprises a housing 48 connected by means of a tapering portion 46 to the pipe 16. The lower portion 50 of the housing 48 comprises a chamber space 63 with a downgoing inner cylindrical portion 52 having an inner space 62. The tubular portion 52 forms an annular space 67, in the upper portion of which is a gas, and in the lower portion of which, in the spaces 63 and 62, is a liquid. The upper portion of the cylindrical part 52 comprises a cylinder which has a movable piston 56. There are a plurality of ports 58 in the wall of the cylinder. The piston in its first, or lowermost position, covers the ports 58. There is a shoulder flange 69 to which the piston is sealed in its lowermost position. Above the piston, and between the piston and the plate 54 is a cylindrical space or small chamber 60.

Liquid under compression is forced down the pipe 16 and into a valve 72, controlled by means of the conductors 79. The valve 72 when open, permits the compressed liquid flowing into the pipe 16 at the surface, to pass through the valve and through an orifice 68 in the plate 54, and into the small chamber 60. The pressure of this liquid pushes the piston 56 down to its lowermost position, where it is sealed against the shoulder 69. Liquid from the space 60 passes through one or more orifices 66 down into the lower large chamber 62. As the chamber 62, 63 fills up with liquid, compressed gas is passed down the spaghetti tubing 84 inside of the pipe 16 where it is controlled by a valve 82 and is flowed through line 86 into the annular space 67 in the large chamber.

The liquid in the small chamber 60 and in the large chamber 62 finally reaches the same pressure. However, because there is a greater area in the upper surface of the piston than there is in the lower surface, the piston is held down and sealed to the shoulder 69. The gas pressure in the space 67 is maintained at substantially the same pressure.

When the fluid in the chamber 62 is to be discharged through the ports 58, an electrically operated valve 76 controlled by leads 75 suddenly opens the small chamber 60 through the opening 70 to and through opening 78 to the outside of the chamber 48, in the annulus 31 between the chamber and the walls 10 of the bore hole. There is liquid at a lesser pressure than the liquid pressure in the small chamber 60 so that opening the chamber 60 to the outside through the valve 76 causes a rapid flow of liquid to the annulus, reducing the pressure in space 60 to the point where the pressure in the liquid in the large chamber 62 is now high enough to force the piston rapidly upwards, exposing the ports 58, so that the pressurized, compressed liquid in the space 62, backed by the compressed gas in the space 67, explosively issues from the ports 58 into the liquid in the annulus 31. This explosive ejection of the liquid into the annular space generates a shock wave in the earth, and which proceeds as a seismic wave to expand spherically until it reaches the surface, and is detected by the plurality of geophones 34, etc., and is recorded.

To reset the chamber, the valve 76 is closed, and the valve 72 is opened, again permitting pressurized liquid to pass into the small chamber 60 to force the piston back down against its seal against the shoulder 69, closing off the ports 58, and permitting the liquid pressure in the lower chambers 62 and 63 to build up to the pressure inside the pipe 16. As before, after the liquid is built up, the gas pressure in the space 67 is built up to the same pressure by means of the compressed air line 84 and the valve 82. The system is now ready for another operation and another generation of a seismic wave.

The three sets of control conductors for operating the valves 72, 76 and 82 namely 79, 75 and 80 are carried to the surface inside of the pipe 16 where they are protected from damage as the pipe is run into and out of the borehole.

Figure 2:
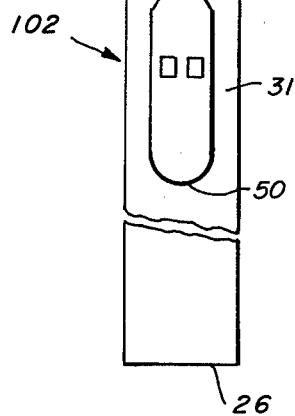
FIG. 2 illustrates a detail involving the use of one or more pressure detectors to detect the passage of a seismic wave up the rocks bordering a borehole.
Figure 2:
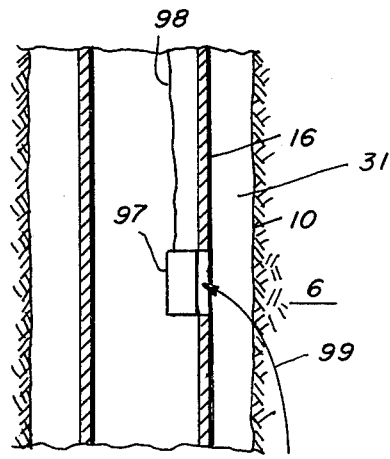

In FIG. 2 is shown a small portion of the pipe 16 positioned in the borehole 10. On the inside of the pipe is a sensor 97 which is a pressure sensor responsive to seismic waves in the earth. This sensor is mounted on the pipe 16 at a selected distance above the chamber 102 so that the seismic wave that is generated by the explosive ejection of pressurized fluid at the ports 58 will travel up through the rocks bordering the borehole, in accordance with arrows 99 and will be received by the sensor and the signals generated by the sensor will be carried by leads 98 up to the surface end of the pipe and through cables 28 and 30 to the control 32, and to the amplifier and recorder. Thus using a plurality of sensors 97 spaced at selected distances up the pipe, it will be possible to time the passage of these seismic waves generated at the chamber 102 so that the velocity of propagation of the seismic wave in the rocks bordering the borehole can be determined.

Referring now to FIG. 4 there is shown another embodiment 102' of the chamber 102, as shown in FIG. 3. This again uses a combination of liquid and gas that is pressurized in order to generate a seismic wave as the valve is opened. As in FIG. 3 there is a lower large chamber with spaces 193, 194 filled with liquid. There is a third, air chamber 195 separated from the large chamber 193, 194 by a light piston 192. This piston 192 has a lower stop at shoulder 196 and an upper stop at shoulder 191. The purpose of the piston 192 is to seperate the compressed gas in space 195 pushing on the piston 192, from the liquid in spaces 193, 194, so that when the ports 58 are opened the gas in 195 will explosively eject the compressed water out the ports, but the compressed gas will be retained in space 195 by the piston 192.

Compressed air is carried down through the spaghetti tubing 184 inside of the pipe 116, through a valve 172, which, when opened, passes the air into the space 160 through an opening 128. This pressurized air causes the piston 156 to move down and to be sealed as in FIG. 3, against the shoulder 69. Pressurized liquid which fills the inside of the pipe 116 is controlled by valve 176 which passes down through the pipe 120 through the opening 124 into the space 194 so that liquid fills the spaces 194 and 193. Compressed air in the space 160 flows through conduit 122, which is of small diameter or has an orifice, into the compressed air space 195. In the final situation, the air pressure in the space 160 and the air pressure in the space 195 are the same, and equal to or greater than the liquid pressure in the spaces 193, 194.

Now, to initiate the opening of the ports 58, the valve 182, which is connected through the pipe 126 to the space 160, and through the pipe 130 to the annular space 31 in the borehole, is opened permitting the air pressure in the space 160 to flow rapidly outwardly to the annular space 31, around the chamber 102'. The reduction in pressure in the space 160 permits the pressurized liquid in 193, 194 to rapidly expand and move the piston 156 upwardly, exposing the ports 58 and permitting the pressurized liquid to explosively expand through the ports 58 into the liquid in the annulus, thereby generating a shock wave in the earth and setting up a seismic wave, which travels to the surface.

As in the case of FIG. 3, it is the liquid flow which passes through the ports 58 into the annulus creating the shock wave. However, the liquid is backed by compressed gas in the space 195 so that there is an explosively initiated ejection of liquid through the ports, which has a continuing flow because of the expansion of the gas in the space 195.

By opening the valve 172 again, the piston 156 is pushed down again to its lower position, shutting off the ports 58 and terminating the outflow of liquid from the space 162. If this opening of valve 172 and stopping of the flow through the ports is done quickly, then the gas which has been driving force in the space 195 will have pushed the liquid up through the cylinder 152 from the spaces 194, 193 but will not have been ejected from the ports 58. The purpose of the piston 192, when it reaches the stop shoulder 191, is to prevent ejection of the compressed gas in space 195.

In the conventional seismic operation offshore, considerable use has been made of what is called the "gas gun", which has a chamber filled with compressed gas having a very fast acting valve, which can be rapidly opened exposing ports through which the compressed gas can be explosively ejected into the sea, creating a shock wave, as is well known in the art.

However, the explosive issuance of the compressed gas into the water causes a large bubble of gas to form around the gun, which gas, because of the inertia of the water surrounding it, and its own compressibility, serves as an oscillating hydraulic system, creating a series of pulses in the water, each of which generates its own seismic wave. This long train of seismic pulses causes considerable difficulty in the determination of the precise timing of the seismic wave, and is to be avoided if at all possible.

The pressurized chambers and valves shown in FIGS. 3 and 4 could also be used with compressed air, which is pumped into the pipe at the surface and passes down to the chamber at the bottom. However, a large volume of compressed gas issuing from the ports 58 in the confined space 31 of the annulus in the borehole could explosively drive all the liquid up the borehole. This would be a dangerous thing to do, since it would reduce the bottom hole pressure in the liquid in the well, and may cause difficulties due to gas blowout, etc.

Consequently, it is a particular objective of this invention to provide a system for initiating a seismic wave in a liquid filled borehole which operates on a principal similar to the gas gun, but which ejects liquid instead of gas. While compressed liquid could be used alone in a manner similar to the compressed gas of the conventional gas gun, it is believed that the combination of liquid filled chamber, and a compressed gas drive for the liquid will provide a much improved generation of high amplitude seismic waves. Therefore the combination of a liquid gun, with a gas drive, is believed to be preferred for use in the bottom of the borehole.

The system shown in FIG. 4 prevents the large volume of pressurized gas from leaving the gun. Only the small volume in space 160 is ejected into the annulus. However, even this small volume of gas could be prevented from leaving by pressurizing space 60 with liquid as in FIG. 3.

However, where circumstances permit, this invention will be workable with a gas fluid in the chamber as well as a liquid fluid or a combination of liquid or gas.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. Apparatus for seismic logging of the position of a deep borehole in the earth at least partially filled with liquid, comprising:
   a. a plurality of ground motion sensors positioned in a two dimensional array on the earth about said boreholes, and means to amplify and record the output signals of said sensors;
   b. a long continuous pipe and means for inserting the free end of said pipe into the mouth of said borehole and lowering it to selected depth in said borehole and means for determining the length of said pipe in said borehole;
   c. means for introducing a fluid under high pressure into the surface end of said pipe, whereby said pipe will be filled with said pressurized fluid;
   d. chamber means on the lower end of said pipe for storing said pressurized fluid the pressure of said pressurized fluid being greater than the pressure in said liquid in said borehole;
   e. means for suddenly opening said chamber to the liquid in said borehole in the vicinity of said chamber; and f. means for determining the time instant of said opening.

2. The apparatus as in claim 1 in which said fluid is a liquid.

3. The apparatus as in claim 1 in which said fluid is a gas.

4. The apparatus as in claim 2 including means to provide a high pressure gas to pressurize said high pressure liquid in said chamber means.

5. The apparatus as in claim 1 in which said chamber includes fast-acting shuttle means to open said chamber to said liquid in said borehole.

6. The apparatus as in claim 1 in which said chamber means comprises;
   a. first small chamber means;
   b. second large chamber means;
   c. shuttle means separating said small chamber means from said large chamber means, said shuttle means covering ports between said larger chamber means and said liquid in said borehole in its first position, and uncovering said ports in its second position; and including
   d. first valve means to connect the space inside said pipe to permit said pressurized fluid to flow into said small chamber means, whereby said shuttle means will be pushed from its second position to its first position covering said ports;
   e. perforation means in said shuttle means to permit the flow of pressurized fluid into said large chamber means;
   f. and valve means to suddenly connect said small chamber means to said liquid in said borehole;
   whereby said shuttle will be forced from its first position to its second position, uncovering said ports, and permitting the fluid in said large chamber means to be explosively ejected out of said ports.

7. The apparatus as in claim 6 in which said fluid is gas.

8. The apparatus as in claim 6 in which said fluid is liquid, and including a portion of said large chamber means occupied by pressurized gas, adapted to force said liquid to and through said ports.

9. The system as in claim 1 including conductor means inside said pipe connecting controlled means in said chamber means to surface control means.

10. The system as in claim 1 in which said fluid is liquid and including a small tubing inside said pipe for supplying high pressure gas from the surface to said chamber means.

11. The system as in claim 1 including at least one pressure sensor means in the wall of said pipe at a selected distance above said ports, and conductor means inside said pipe connecting said sensor means to the surface apparatus.

12. A pressurized liquid gun for initiating seismic waves while immersed in a volume of water associated with the earth; comprising
   a. an elongated housing;
   b. a central cylinder coaxial with said housing;
   c. a piston shuttle adapted to move in said cylinder from a first position where it covers a plurality of ports in the wall of said cylinder to a second position toward the closed end of said cylinder, where said ports are uncovered;
   d. valve means for injecting high pressure liquid into the small chamber between said closed end of said cylinder and said shuttle whereby said shuttle is moved to its first position, the pressure of said high pressure liquid being greater than the pressure in said volume of water;
   e. at least one orifice through said shuttle whereby liquid flows from said small chamber through said orifice into a large chamber filling said large chamber;
   f. annular space means in said large chamber, and means to inject high pressure gas into said annular space, whereby said pressurized gas acts against said pressurized liquid; and
   g. means to suddenly connect the interior of said small chamber to the outside of said chamber means;
   whereby the pressure will drop in said small chamber, permitting said shuttle to move to its second position uncovering said ports, and said compressed liquid in said large chamber under the force of said pressurized gas will explosively expand out of said ports generating a seismic wave in said volume of water surrounding said housing.

13. A pressurized liquid gun for initiating seismic waves while immersed in a volume of water associated with the earth; comprising
   a. an elongated housing;
   b. a central cylinder coaxial with said housing;
   c. a piston shuttle adapted to move in said cylinder near the first end thereof from a first position where it covers a plurality of ports in the wall of said cylinder to a second position toward the closed first end of said cylinder, where said ports are uncovered;
   d. valve means for injecting high pressure gas into the small chamber between said closed first end of said cylinder and said shuttle, whereby said shuttle is moved to its first position covering said ports;
   e. conduit means for supplying pressurized liquid to a large chamber comprising a portion of said cylinder on the opposite side of said piston shuttle from said small chamber, the pressure of said pressurized liquid being greater than the pressure in said volume of water;
   f. second piston means in said cylinder forming the end of said large chamber opposite to said piston shuttle;
   g. gas chamber means comprising the portion of said cylinder between said second piston and the second closed end of said cylinder;
   h. orifice means connecting said small chamber means to said gas chamber means;
   whereby said small chamber and said gas chamber means will be filled to the same gas pressure, at least equal to or greater than the pressure of the liquid in said larger chamber; whereby said pressurized gas in said gas chamber acts against said second piston means and against said liquid in said large chamber; and
   i. means to suddenly connect the interior of said small chamber to the outside of said chamber means;
   whereby the pressure will drop in said small chamber, permitting said shuttle to move to its second position uncovering said ports, and said compressed liquid in said larger chamber under the force of said pressurized gas will explosively expand out of said ports generating a seismic wave in the water surrounding said housing.

14. A pressurized liquid gun for initiating seismic waves while immersed in a volume of water associated with the earth, comprising:
   a. an elongated housing including a central cylinder;
   b. a piston shuttle means adapted to move in said cylinder from a first position where it covers a plurality of ports in the wall of said cylinder to a second position where said ports are uncovered and connect the inside of said cylinder to the outside of said gun;
   c. means for holding said shuttle means in said first position;
   d. means for filling a large chamber portion of said cylinder with pressurized liquid, said liquid confined by said shuttle means;
   e. means for pressurizing liquid with a volume of pressurized gas, the pressure of said pressurized liquid being greater than the pressure in said volume of water; and
   f. means for driving said shuttle means rapidly to said second position;
      whereby said ports will be uncovered and said pressurized liquid will be forced by said pressurized gas to explosively eject from said ports.

15. The pressurized liquid gun as in claim 12 in which said volume of water is in a borehole in the earth.

16. The pressurized liquid gun as in claim 13 in which said volume of water is in a borehole in the earth.

* * * * *